United States Patent
Isoda et al.

(10) Patent No.: US 8,090,419 B2
(45) Date of Patent: Jan. 3, 2012

(54) FOLDING PORTABLE WIRELESS APPARATUS

(75) Inventors: Yutaka Isoda, Kanagawa (JP); Nobuharu Mashima, Toyama (JP); Akito Sakamoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1097 days.

(21) Appl. No.: 11/569,881

(22) PCT Filed: Jun. 2, 2005

(86) PCT No.: PCT/JP2005/010153
§ 371 (c)(1), (2), (4) Date: Dec. 1, 2006

(87) PCT Pub. No.: WO2005/120021
PCT Pub. Date: Dec. 15, 2005

(65) Prior Publication Data
US 2009/0181732 A1    Jul. 16, 2009

(30) Foreign Application Priority Data
Jun. 4, 2004 (JP) .................. 2004-167138

(51) Int. Cl.
*H04M 1/00* (2006.01)
(52) U.S. Cl. ............... 455/575.3; 455/575.1; 455/575.7; 455/272
(58) Field of Classification Search ............... 455/575.3, 455/73, 269, 277.1, 272, 575; 343/702, 893; 361/600–837
See application file for complete search history.

(56) References Cited

U.S. PATENT DOCUMENTS

| | | | | |
|---|---|---|---|---|
| 5,432,676 | A | * | 7/1995 | Satoh et al. .................. 361/752 |
| 6,026,280 | A | * | 2/2000 | Yokomura ...................... 455/78 |
| 6,247,947 | B1 | * | 6/2001 | Knoernschild et al. ....... 439/159 |

(Continued)

FOREIGN PATENT DOCUMENTS

EP    474490 A1 *  3/1992

(Continued)

OTHER PUBLICATIONS

European Search Report.

*Primary Examiner* — Lester Kincaid
*Assistant Examiner* — Daniel Lai
(74) *Attorney, Agent, or Firm* — Seed IP Law Group, PLLC

(57) ABSTRACT

An object of the invention is to provide a folding-type portable wireless equipment which can obtain good antenna characteristics in each of opened and closed states with a simple configuration without spoiling miniaturization.

A folding-type portable wireless equipment (100) having a first case (11) and a second case (12) includes a first circuit board (101) disposed at the first case (11), a second circuit board (102) disposed at the second case (12), a bendable coupling portion (13) which mechanically couples the first case (11) and the second case (12), a flexible coupling element (103) which electrically couples the first circuit board (101) and the second circuit board (102), a radio circuit portion (106) provided at the second circuit board (102), an antenna element (104) coupled to the radio circuit portion (106) via a feeder line (105), and a switching portion (109) which selectively connects and disconnects between the first circuit board (101) and the antenna element (104) in accordance with an opened/closed state of the folding-type portable wireless equipment (100), wherein the antenna element (104) and the feeder line 105 are dispose at positions almost along the coupling portion (103).

10 Claims, 4 Drawing Sheets

U.S. PATENT DOCUMENTS

| | | | |
|---|---|---|---|
| 6,445,348 B1 * | 9/2002 | McCoy et al. | 343/702 |
| 6,792,256 B1 * | 9/2004 | Kinney et al. | 455/277.1 |
| 7,016,184 B1 * | 3/2006 | Oneyama et al. | 361/679.27 |
| 7,155,253 B2 * | 12/2006 | Sawayama et al. | 455/556.1 |
| 2003/0045246 A1 * | 3/2003 | Lee et al. | 455/90 |
| 2004/0027298 A1 * | 2/2004 | Iguchi et al. | 343/702 |
| 2005/0054395 A1 * | 3/2005 | Arbisi et al. | 455/575.3 |
| 2005/0243000 A1 * | 11/2005 | Hwang et al. | 343/702 |

FOREIGN PATENT DOCUMENTS

| | | |
|---|---|---|
| EP | 1 424 747 A1 | 6/2004 |
| JP | 06291687 A * | 10/1994 |
| JP | 2001-156898 | 6/2001 |
| JP | 2002-335180 | 11/2002 |

* cited by examiner

FOLDING PORTABLE WIRELESS APPARATUS

TECHNICAL FIELD

The present invention relates a folding-type portable wireless equipment having an antenna for radio communication, in which two cases are coupled to each other via a bendable plane-shaped coupling member so as to be opened and closed.

BACKGROUND ART

In recent years, although portable wireless equipments such as portable telephones have been widely spread, various types of the portable telephones have been developed. Among the various types of the portable telephones, compact folding-types have been widely used in each of which upper and lower cases are folded in an unused state thereby to enhance the portability. Such a portable telephone has the structure capable of changing its configuration in accordance with a using state, so that it is important to secure the antenna performance in each of opened and closed states. In such a folding-type portable telephone, the miniaturization and the multi-functioning have been advanced. As the multi-functioning in recent years, the improvement of design and the differentiation from other portable telephones have been advanced. As one of the demands requested in such the multi-functioning, there is the antenna configuration having no projection. Further, a new design having no conventional mechanical hinge structure has been requested in the meaning of the differentiation. Conventionally, in the folding-type portable telephone, the following three configurations are generally known as the configuration for obtaining good antenna performance in each of the opened and closed states.

The first configuration of the folding-type portable telephone is arranged in a manner that a projection type antenna is mounted on the hinge side of the lower case. A helical antenna or an extensible monopole antenna is generally used as the projection type antenna. In the opened state, the antenna acts as a resonance element which vibrates the upper case, whereby the entirety of the portable telephone operates as the dipole antenna in which an upper board and a lower board act as a radiation element. Further, since the antenna portion protrudes from the case, the antenna gain can be made high advantageously in a state where the portable telephone is held by a hand. Furthermore, in the closed state, the wavelength is shortened by the radiation element such as the helical antenna, so that the telephone operates as the monopole antenna of λ/4.

The second configuration of the folding-type portable telephone is arranged in a manner that the antenna is contained within the case thereby to eliminate the projection portion, that is, for example, an L-shaped antenna or a reverse F-shaped antenna etc. is mounted within the case. Such an antenna operates in a state of being completely housed within the case.

The third configuration of the folding-type portable telephone is arranged to apply the operation theory of the first configuration in a manner that the antenna is mounted on the hinge side of the lower case thereby to use the upper case as the radiation element in the opened state. That is, the antenna is configured so as to have no projection and the upper case is directly vibrated thereby to use as the radiation element in the opened state.

FIG. 5 is a diagram showing the schematic configuration of a folding-type portable telephone described in a patent document 1, in which (a) shows an opened state and (b) shows a closed state.

As shown in FIG. 5, the folding-type portable telephone described in the patent document 1 is arranged in a manner that an upper case 1 and a lower case 2 are coupled via a hinge portion 3 to each other so as to be foldable. The upper case 1 is provided with a shield box 4 for shielding a circuit board contained therein, and the shield box 4 also has the function of an antenna. The lower case 2 is provided with a shield box 5 for shielding a circuit board on which a transmission circuit 6 etc. are formed. The transmission circuit 6 is coupled to the shield box 4 of the upper case 1 via a flexible board 7 housed within the hinge portion 3. According to this configuration, since there is no height limitation in the case from which radio wave is radiated and the entirety of the case can be made large as an effective area of the antenna, the antenna performance of a large band and a high gain can be obtained.

Patent Document 1: JP-A-2002-335180

DISCLOSURE OF THE INVENTION

Problems that the Invention is to Solve

According to the first configuration, the projection portion of the antenna spoils the general view as the portable telephone. Further, since a whip antenna requires a space to be housed within the case, it is an obstacle to the miniaturization and the thinning of the portable wireless equipment. Furthermore, since the antenna portion protrudes from the cases, the antenna gain can be made high advantageously in the state where the portable telephone is held by a hand. However, since a current flows concentrically at the antenna portion as the radiation element, the characteristics at the time of speech varies largely since it is largely influenced by a hand or a face at the time of speech.

According to the second configuration, in the case of the construction where the L-shaped antenna is mounted on the hinge side of the lower case, the antenna operates as the resonance element for vibrating the upper case like the case of using the helical antenna. However, since the length of the monopole antenna contained within the case is limited in its length, the coupling degree thereof with the upper case is week in the opened state and so the characteristics is degraded. Further, in the case of the structure where the reverse F-shaped antenna is mounted in the upper case, in order to secure the antenna characteristics, it is necessary to take a sufficient distance between the antenna and the circuit board within the upper case and also to make the area of a plate-shaped antenna large. To this end, such requirements becomes an obstacle to the miniaturization and the thinning of the portable telephone.

According to the folding-type portable telephone described in the patent document 1, as shown in FIG. 5(a), in the opened state, a current a flowing through the upper case 1 and a current b flowing through the lower case 2 flow in the same direction, so that the telephone operates as an ideal dipole antenna of λ/2. However, in the closed state, as shown in FIG. 5(b), since the current a flowing through the upper case 1 and the current b flowing through the lower case 2 flow in the opposite directions to each other, both the currents cancel to each other, so that the telephone does not operate theoretically.

FIG. 6 shows the results of an experimentation in which the antenna performance of the folding-type portable telephone shown in FIG. 5 was inspected. In this experimentation, graphs were prepared in a manner that the used frequency was 900 MHz and the abscissa represents the frequency (MHz) and the ordinate represents VSWR (Voltage Standing Wave Ratio). In FIG. 6, a symbol α shows the graph representing change of the antenna characteristics (VSWR) in the opened state and a symbol β shows the graph representing change of the antenna characteristics (VSWR) in the closed state. As clear from the experimental result shown in FIG. 6, the width of the frequency band satisfying VSWR<3 (the reflection wave is equal to 50% or less) which is one of conditions for obtaining good antenna characteristics was 350 MHz or more in the opened state. In contrast, in the closed state, there was no frequency band satisfying VSWR<3, whereby the large degradation of the characteristics could be confirmed. Thus, another antenna operating in the closed state is required, so that the circuit configuration becomes complicated.

The invention is performed in view of the aforesaid circumstances and an object of the invention is to provide a folding-type portable wireless equipment which can obtain good antenna characteristics in each of opened and closed states with a simple configuration without spoiling miniaturization.

Means for Solving the Problem

The folding-type portable wireless equipment according to the invention is the folding-type portable wireless equipment having a first case and a second case, which includes: a first circuit board disposed at the first case; a second circuit board disposed at the second case; a bendable plane-shaped coupling member which mechanically couples the first case and the second case; a flexible coupling conductor which electrically couples the first circuit board and the second circuit board; a radio circuit portion provided at the second circuit board; an antenna coupled to the radio circuit portion via a feeder line; and a switching means which selectively connects and disconnects between the first circuit board and the antenna in accordance with an opened/closed state of the folding-type portable wireless equipment, wherein the antenna and the feeder line are dispose at positions almost along the plane-shaped coupling member.

According to this configuration, in the configuration of opening and closing the cases by using the bendable plane-shaped coupling member, it is possible to obtain good antenna characteristics in each of the opened and closed states with a simple configuration without spoiling miniaturization.

Further, the folding-type portable wireless equipment according to the invention is arranged in a manner that the switching means connects between the first circuit board and the antenna when the folding-type portable wireless equipment is in the opened state, and disconnects between the first circuit board and the antenna when the folding-type portable wireless equipment is in the closed state.

According to this configuration, in the opened state, the first circuit board and the antenna are coupled and so the antenna is configured by the first case and the second circuit board. Thus, in the opened state, the antenna characteristics substantially same as that of the antenna configuration in which the upper case is directly vibrated can be obtained. In contrast, in the closed state, the first circuit board is not coupled with the antenna and so the antenna is configured by the antenna and the second circuit board. Since the antenna and the feeder line are disposed at the positions almost along the plane-shaped coupling member, the antenna is disposed at the position away from the first circuit board and the second circuit board in the closed state, whereby the antenna performance in the closed state can be improved.

Advantages of the Invention

According to the invention, it is possible to provide the folding-type portable wireless equipment which can obtain good antenna performance in each of the opened and closed states with a simple configuration without spoiling miniaturization.

DESCRIPTION OF REFERENCE NUMERALS

Figure 1:
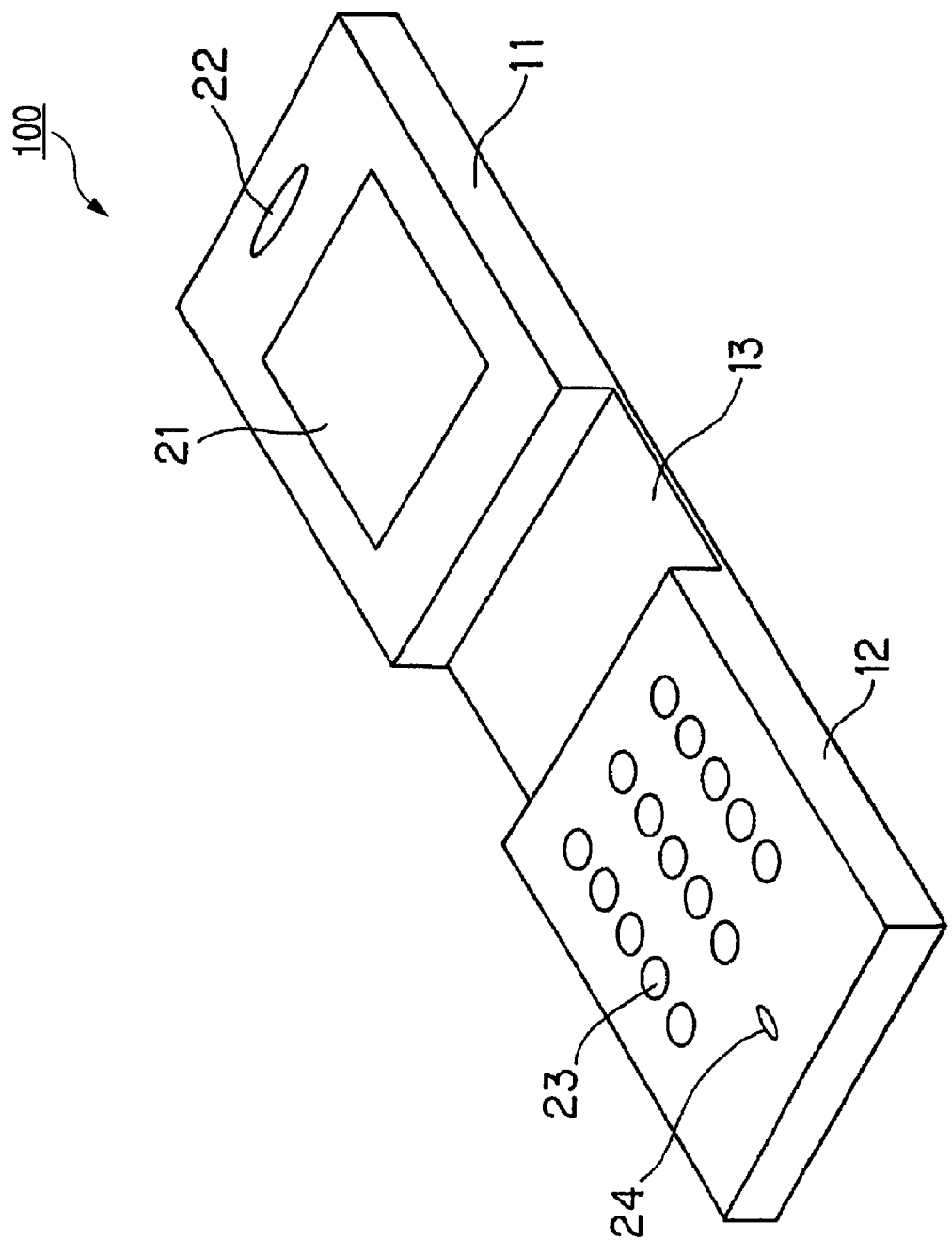
FIG. 1 is a perspective view showing the external configuration of a folding-type portable wireless equipment in order to explain the embodiment of the invention.

100 folding-type portable wireless equipment
11 first case
12 second case
13 coupling portion
101 first circuit board
102 second circuit board
103 coupling element
104 antenna element
105 feeder line
106 radio circuit portion
109 switching portion

BEST MODE FOR CARRYING OUT THE INVENTION

Hereinafter, the explanation will be made with reference to drawings as to a folding-type portable wireless equipment represented by a portable telephone etc. in order to explain an embodiment of the invention.

Figure 2:
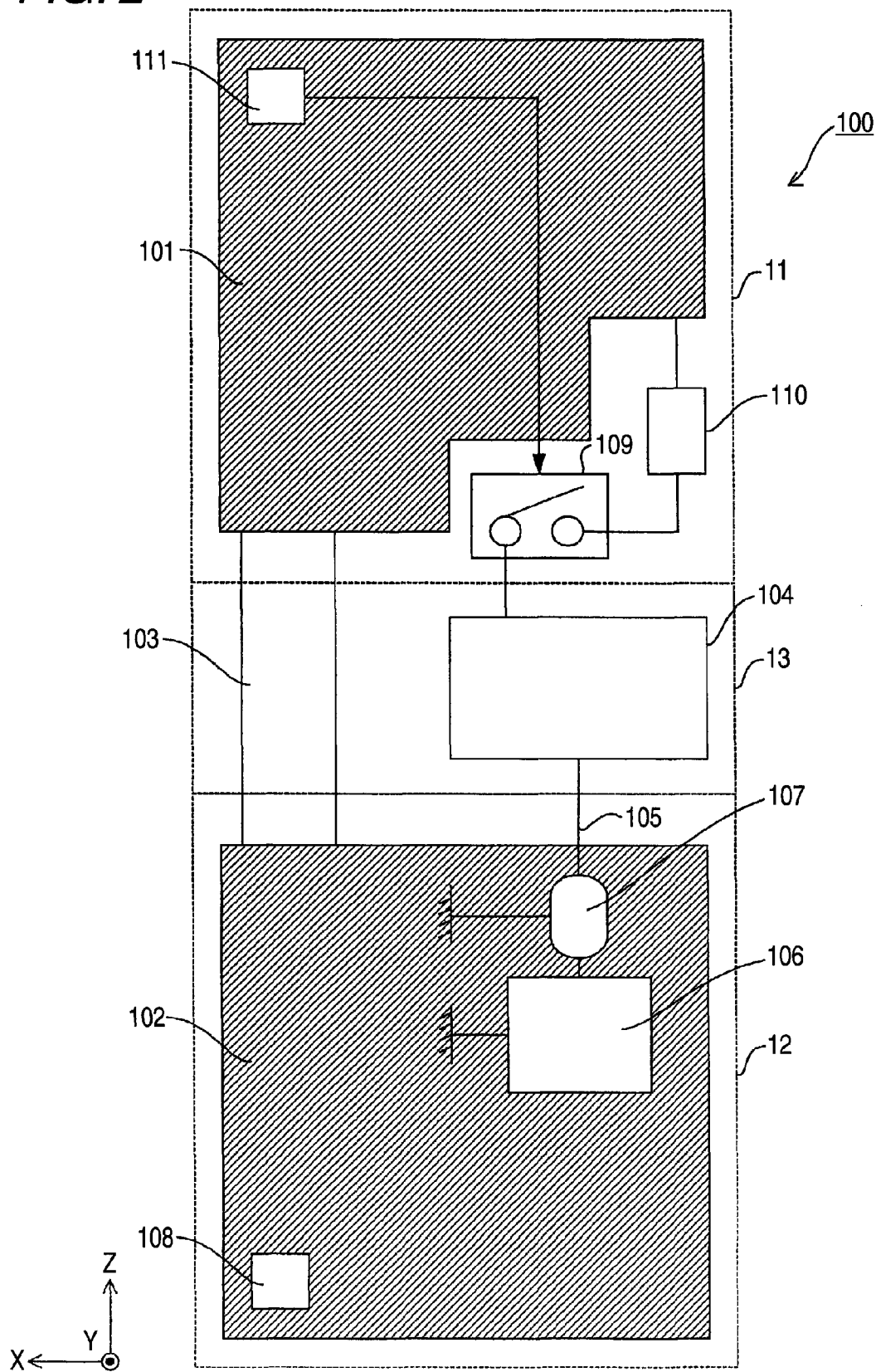
FIG. 2 is a front view showing the configuration of a main portion of the folding-type portable wireless equipment in an opened state thereof in order to explain the embodiment of the invention.
Figure 3:
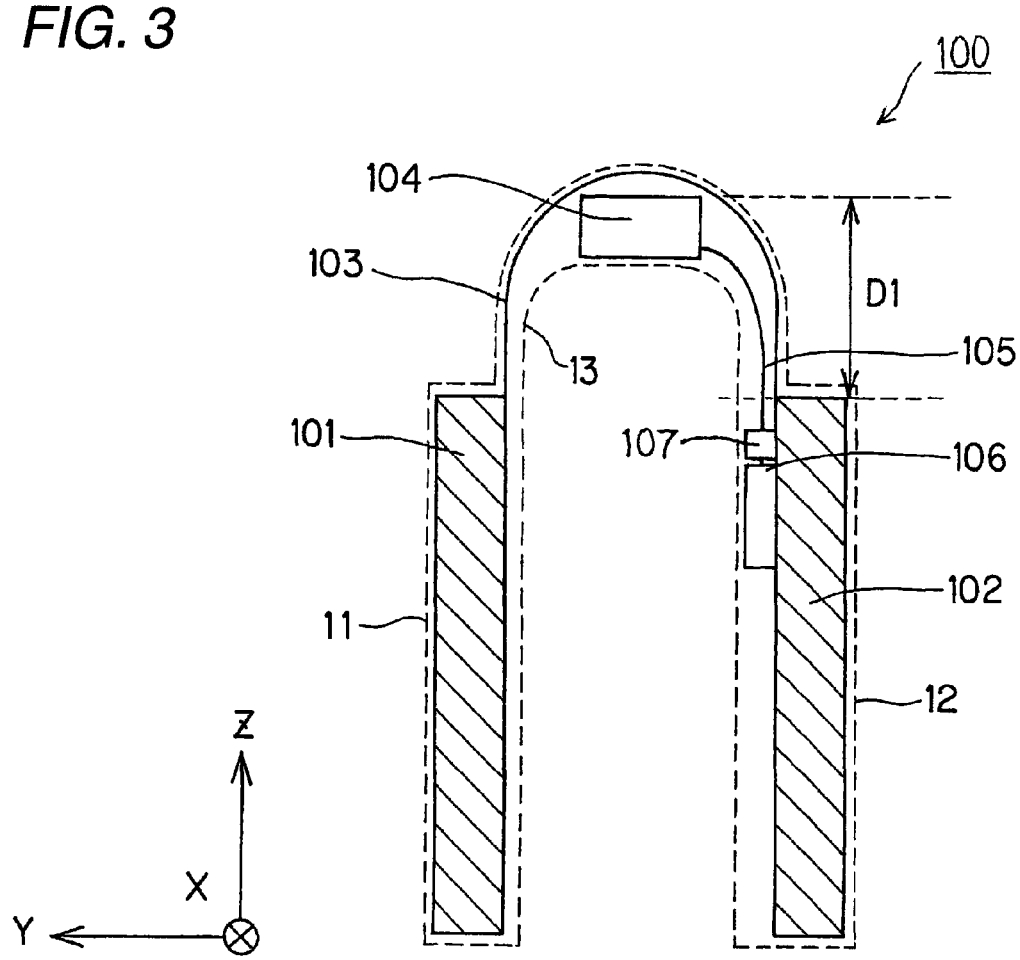
FIG. 3 is a side view showing the configuration of the main portion of the folding-type portable wireless equipment in a closed state thereof in order to explain the embodiment of the invention.

FIG. 1 is a perspective view showing the external configuration of a folding-type portable wireless equipment in order to explain the embodiment of the invention. FIG. 2 is a front view showing the configuration of a main portion of the folding-type portable wireless equipment in an opened state thereof in order to explain the embodiment of the invention. FIG. 3 is a side view showing the configuration of the main portion of the folding-type portable wireless equipment in a closed state thereof in order to explain the embodiment of the invention.

As shown in FIGS. 1 to 3, the folding-type portable wireless equipment according to the embodiment includes a first case 11 and a second case 12. The wireless equipment is configured in a manner that the first case 11 and the second case 12 are coupled to each other via a coupling portion 13 constituting a bendable plane-shaped coupling member 13 so as to be able to bend (bend or curve) the first case and the second case, whereby the coupling portion 13 is bendable so as to take the closed state where the first case 11 and the second case 12 are opposed and overlapped and take the opened state where the first case 11 and the second case 12 are not opposed nor overlapped. That is, the wireless equipment is configured so as to be foldable. The first case 11 is provided with a display portion 21 constituted by a liquid crystal display device etc. and a receiver 22 etc. The second case 12 is provided with an operation portion 23 having a plurality of operation key buttons and a microphone 24 etc.

The coupling portion 13 has an exterior portion which is formed by polymer material etc. with flexibility and includes therein a flexible wiring cable, and an antennal element 104, and a holding member 105 (see FIGS. 2 and 3) etc. The coupling portion 13 couples the short side portions of the first case 11 and the second case 12 each having a rectangular shape. Further, although not shown, the coupling portion 13 is provided with a coupling member formed by a metal plate etc. for holding the opened state of the cases, and the exterior portions etc. of the cases are provided with a holding mechanism for holding the closed state.

As shown in FIGS. 2 and 3, the first case 11 contains therein a first circuit board 101, a reactance element 110 and a switching portion 109 etc. and the second case 12 contains therein a second circuit board 102. The first circuit board 101 and the second circuit board 102 are electrically coupled to each other by means of a flexible coupling element 103 which is provided at the coupling portion 13 and serves as a coupling conductor. The switching portion 109 is coupled at its one end to the antenna 104 and coupled at its the other end to the first circuit board 101 via the reactance element 110.

On the first circuit board 101, a ground pattern is formed and further an opened/closed state detection portion (for example, a Hall element) 111 for detecting the opened and closed states of the folding-type portable wireless equipment 100 is provided. On the second circuit board 102, a ground pattern is formed, and further an opened/closed state detection portion (for example, a permanent magnet) 108 for detecting the opened and closed states of the folding-type portable wireless equipment 100, a matching circuit 107 for performing the impedance matching and a radio circuit portion 106 etc. are provided.

The matching circuit 107 is coupled to the antenna element 104 via a feeder line 105. The radio circuit portion 106 is coupled to the antenna element 104 via the matching circuit 107 and the feeder line 105.

The antenna element 104 is configured by a conductive wire with a diameter of 1 mm, for example, and is disposed between the first circuit board 101 and the second circuit board 102 at the side portion of the coupling element 103 in the coupling portion 13.

The coupling element 103, the antenna element 104 and the feeder line 105 are disposed at positions almost along the coupling portion 13 constituting the plane-shaped coupling member. The antenna element 104 is set to a position where the antenna element does not overlap with the first circuit board 101, the second circuit board 102 and the coupling element 103 in the opened state shown in FIG. 2. For example, the antenna element is disposed at the center portion which is away by the same distance from each of the end portions of the first circuit board 101 and the second circuit board 102 each contacting with the coupling element 103.

When the folding-type portable wireless equipment 100 is closed (folded) and so the element 111 opposes to the magnet 108 (the state shown in FIG. 3) thereby to detect the magnet 108, the Hall element outputs to the switching portion 109 a closed signal representing that the folding-type portable wireless equipment 100 is in the closed state. In contrast, when the folding-type portable wireless equipment 100 is opened and so the element 111 does not detect the magnet 108, the Hall element outputs to the switching portion 109 an opened signal representing that the folding-type portable wireless equipment 100 is in the opened state.

The switching portion 109 selectively connects the antenna element 104 to the first circuit board 101 via the reactance element 110 in accordance with the opened/closed state of the folding-type portable wireless equipment 100. That is, the switching portion 109 connects the antenna element 104 to the reactance element 110 when the opened signal is received from the element 111, whilst disconnects the antenna element 104 from the reactance element 110 when the closed signal is received from the element 111.

When the reactance element 110 and the antenna element 104 are connected to each other by the switching portion 109, that is, when the folding-type portable wireless equipment 100 is in the opened state as shown in FIG. 2, the entirety of the first case 11 operates as an upper side antenna element. The matching circuit 107 performs the function of matching the impedance of the upper side antenna element to the input impedance of the radio circuit portion 106, and the ground pattern on the second circuit board 102 operates as a lower side antenna element. In this case, the antenna element 104 serves as a feeder line, and the first case 11 and the ground pattern on the second circuit board 102 operate as a dipole antenna. Thus, like the patent document 1, the characteristics substantially same as that of the antenna configuration in which the upper case is directly vibrated can be obtained.

In contrast, when the reactance element 110 and the antenna element 104 are disconnected to each other by the switching portion 109, that is, when the folding-type portable wireless equipment 100 is in the closed state as shown in FIG. 3, the antenna element 104 operates as the monopole antenna of $\lambda/4$. In a state where the cases are closed as shown in FIG. 3, the first circuit board 101 and the second circuit board 102 are disposed so as to be overlapped almost in parallel to each other in a state that the first and second circuit boards are opposed to each other. The antenna element 104 is disposed at the position outside of the boards in the Z direction in FIG. 3, that is, in the extended direction in parallel to the first circuit board 101 and the second circuit board 102. When the longitudinal direction of the circuit boards is set in the vertical direction (Z direction) as shown in FIG. 3, the antenna element 104 is disposed at the high position protruding in the longitudinal direction from the first circuit board 101 and the second circuit board 102, whereby the metal portion near the position is only the coupling element 103. Thus, when a distance D1 between the antenna element 104 and the end portions of the first circuit board 101 and the second circuit board 102 is designed so as to be large in the state shown in FIG. 3, the antenna performance in the closed state can be improved.

Figure 4:
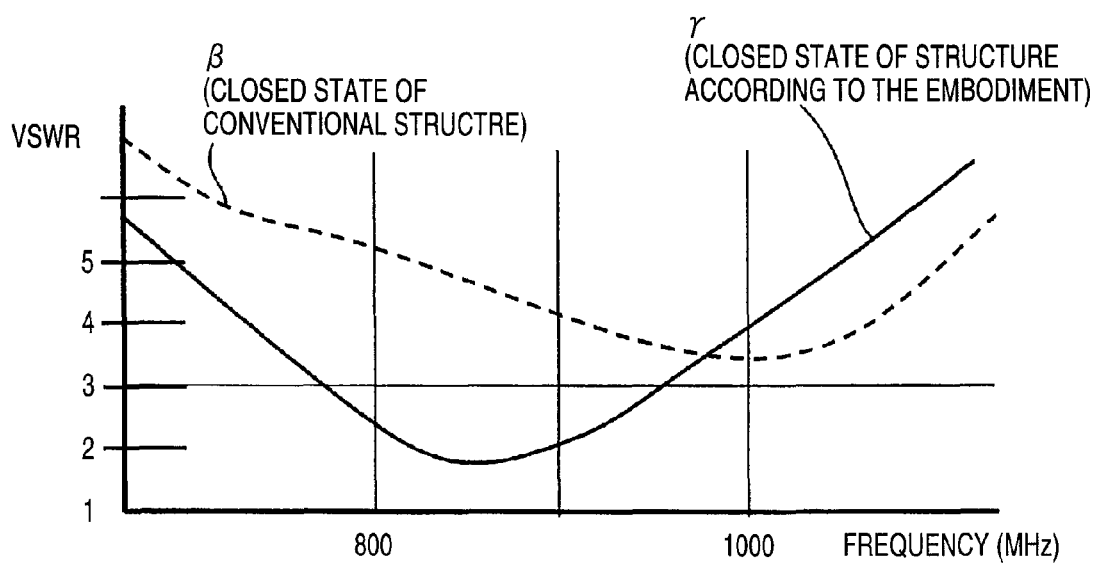
FIG. 4 is a diagram showing the results of experimentations in which the antenna performance of the folding-type portable wireless equipment according to the embodiment in the closed state was inspected and also the antenna performance of the folding-type portable telephone according to the conventional structure was inspected.
Figure 5:
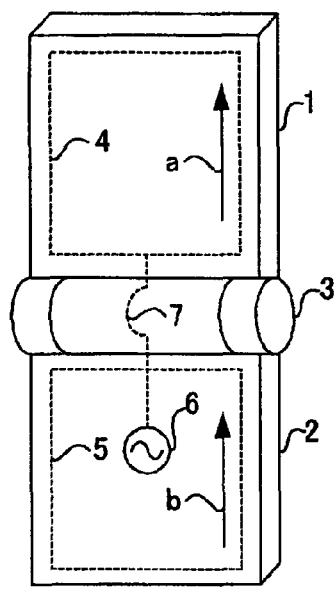
FIG. 5 is a diagram showing the schematic configuration of a folding-type portable telephone described in the patent document 1.
Figure 5:
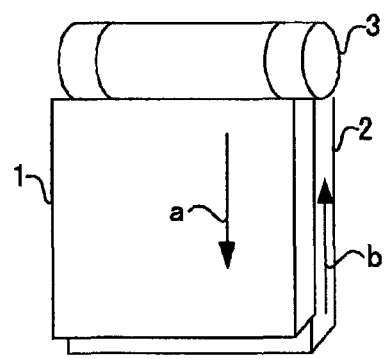
Figure 6:
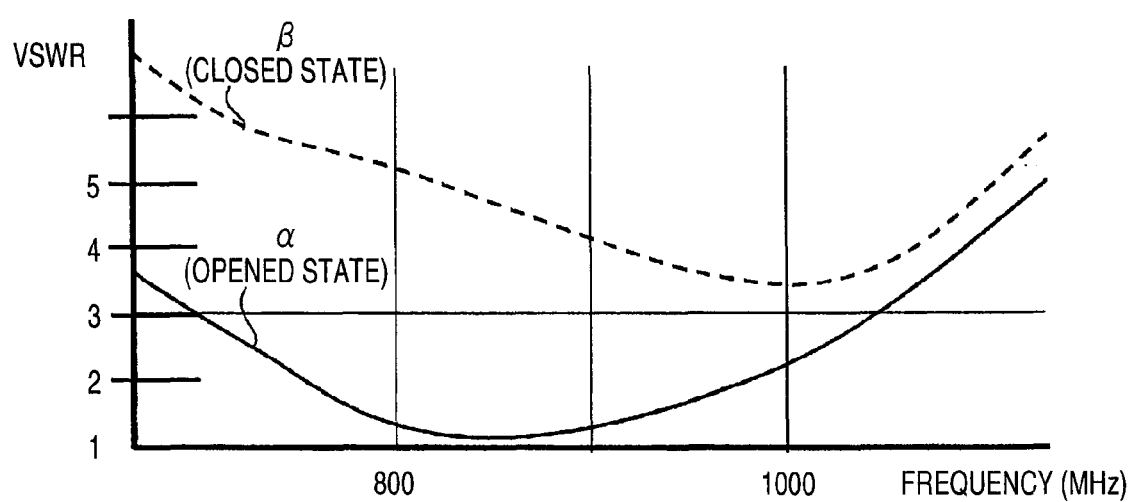
FIG. 6 is a diagram showing the results of an experimentation in which the antenna performance of the folding-type portable telephone shown in FIG. 5 was inspected.

FIG. 4 shows the results of experimentations in which the antenna performance of the folding-type portable wireless equipment 100 according to the embodiment in the closed state was inspected and also the antenna performance of the folding-type portable telephone according to the conventional structure described in the patent document 1 was inspected. In this experimentation, graphs were prepared in a manner that the used frequency was 900 MHz and the abscissa represents the frequency (MHz) and the ordinate represents VSWR. In FIG. 4, a symbol β shows the graph representing change of the antenna characteristics (VSWR) in the closed state of the folding-type portable telephone according to the conventional structure and a symbol γ shows the graph representing change of the antenna characteristics in the closed state of the folding-type portable wireless equipment 100.

As clear from the experimental result shown in FIG. 4, as to the width of the frequency band satisfying VSWR<3 (the reflection wave is equal to 50% or less) which is one of conditions for obtaining good antenna characteristics, it was confirmed that although there is no frequency band satisfying VSWR<3, the folding-type portable wireless equipment 100 has the width of 180 MHz or more.

As described above, according to the folding-type portable wireless equipment 100 of the embodiment, in the opened state, since the antenna element 104 acts as the feeder line, the dipole antenna can be formed by the first case 11 and the ground pattern on the second circuit board 102, so that the antenna performance substantially same as that of the conventional configuration in which the upper case is directly vibrated can be obtained. On the other hand, in the closed state, the antenna element 104 can be configured as the monopole antenna of $\lambda/4$. In the closed state, since the antenna element 104 is disposed at the position outside in the longitudinal direction of the boards from the end portions of the first and second circuit boards, the degradation of the antenna performance can be prevented. Thus, according to the folding-type portable wireless equipment 100 of the embodiment, in each of the opened and closed states, the antenna performance better than that of the conventional configuration can be obtained. Further, since the antenna is configured by using the single antenna element in each of the opened and closed states, the circuit configuration can be made simple and it becomes possible to miniaturize the cases and reduce the manufacturing costs and so on.

Incidentally, the configuration of the antenna element 104 is not limited to the aforesaid configuration example, and the antenna element may be configured in a helical configuration, a monopole configuration or a meander configuration, for example. Further, it is possible to resonate at various frequencies by suitably selecting the length of the antenna element 104. Furthermore, although the aforesaid portable wireless equipment is configured in a manner that the antenna element 104 is disposed almost along the coupling portion 13 within the coupling portion 13, the antenna element 104 is not limited to be disposed within the coupling portion and may be provided along the rear surface of the coupling portion 13, for example.

The invention is not limited to the aforesaid embodiment and may be implemented in various modifications within a range not departing from the gist of the invention.

Although the invention has been explained in detail with reference to the particular embodiment, it should be obvious for those skilled in the art that various changes and modifications may be made without departing from the spirit and the scope of the invention.

The present application is based on Japanese Patent application No. 2004-167138 filed on Jun. 4, 2004, the content of which is hereby incorporated by reference into this application.

INDUSTRIAL APPLICABILITY

The invention has the effects that the antenna performance can be improved in the folding-type portable wireless equipment having the structure that the bendable plane-shaped coupling member is used for the opening and closing mechanism of the cases. The invention is useful for the folding-type portable wireless equipment etc. having the radio communication antenna in which the two cases are coupled to each other by the bendable plane-shaped coupling member so as to be able to open and close.

The invention claimed is:

1. A folding-type portable wireless equipment including a first case and a second case, comprising:
a first circuit board associated with the first case;
a second circuit board associated with the second case;
a bendable plane-shaped coupling member which is non-conductive and mechanically couples the first case and the second case;
a flexible coupling conductor which is arranged in the bendable plane-shaped coupling member and electrically couples the first circuit board and the second circuit board;
a radio circuit portion associated with the second circuit board;
an antenna element which is arranged in the bendable plane-shaped coupling member, electrically coupled to the radio circuit portion via a feeder line and electrically connected to a ground pattern on the second circuit board; and
a switching means which,
when the folding-type mobile wireless equipment is opened, electrically connects the first circuit board and the antenna element, whereby the first circuit board and the ground pattern on the second circuit board perform as a first antenna and the antenna element performs as an extension of the feeder line to the first antenna, and
when the folding-type mobile wireless equipment is closed, electrically disconnects the first circuit board and the antenna element, whereby the antenna element performs as a second antenna.

2. A folding-type portable wireless apparatus, comprising:
a first case associated with a first circuit board;
a second case associated with a second circuit board;
a bendable plane-shaped coupling member that is nonconductive and mechanically couples the first case and the second case;
a flexible coupling conductor that is arranged in the bendable plane-shaped coupling member and electrically couples the first circuit board and the second circuit board;
a radio circuit portion associated with the second circuit board;
an antenna element that is arranged in the bendable plane-shaped coupling member, electrically coupled to the radio circuit portion via a feeder line and electrically connected to a ground pattern on the second circuit board; and
a switch that
when the folding-type mobile wireless equipment is opened, electrically connects the first circuit board and the antenna element, whereby the first circuit board and the ground pattern on the second circuit board perform as a first antenna and the antenna element performs as an extension of the feeder line to the first antenna, and
when the folding-type mobile wireless equipment is closed, electrically disconnects the first circuit board and the antenna element, whereby the antenna element performs as a second antenna.

3. A folding-type portable wireless apparatus having an opened state and a closed state, comprising:
a first case having a first circuit board disposed therein;
a second case having a second circuit board disposed therein;
a bendable coupling member that is nonconductive and mechanically interconnects the first case and the second case, wherein the coupling member bends as the folding-type portable wireless apparatus transitions between the opened state and the closed state;
a flexible coupling conductor that is arranged in the bendable coupling member and electrically couples the first circuit board and the second circuit board;
a radio circuit portion associated with the second circuit board;
an antenna element that is arranged in the bendable coupling member, electrically coupled to the radio circuit portion via a feeder line and electrically connected to ground pattern on the second circuit board; and
a switch configured to,
electrically connect the first circuit board and the antenna element in the opened state, whereby the first circuit board and the ground pattern on the second circuit board perform as a first antenna and the antenna element performs as an extension of the feeder line to the first antenna, and
electrically disconnect the first circuit board and the antenna element in the closed state, whereby the antenna element performs as a second antenna.

4. The folding-type portable wireless apparatus according to claim 3, wherein the antenna element is disposed in-between the first and second circuit boards.

5. The folding-type portable wireless apparatus according to claim 4, wherein the flexible coupling conductor is arranged in the bendable coupling member at a position spaced from the antenna element.

6. The folding-type portable wireless apparatus according to claim 3, wherein the antenna element is disposed substantially equidistant from the first circuit board and the second circuit board when the apparatus is in the closed state.

7. The folding-type portable wireless apparatus according to claim 3, wherein the first and second cases are opposed and substantially overlap in the closed state.

8. The folding-type portable wireless apparatus according to claim 7, wherein the first and second cases are not opposed and do not overlap in the opened state.

9. The folding-type portable wireless apparatus according to claim 3, wherein
the first antenna is a dipole antenna, and the second antenna is a monopole antenna.

10. The folding-type portable wireless apparatus according to claim 3, wherein
the portable wireless apparatus includes a front surface including a display portion and an operation portion and a rear surface opposite the front surface, the antenna element and the flexible coupling member being disposed in the bendable plane-shaped coupling member such that the antenna element and the flexible coupling member do not overlap each other in a direction extending from the front surface to the rear surface.

* * * * *